United States Patent Office 3,120,125
Patented Feb. 4, 1964

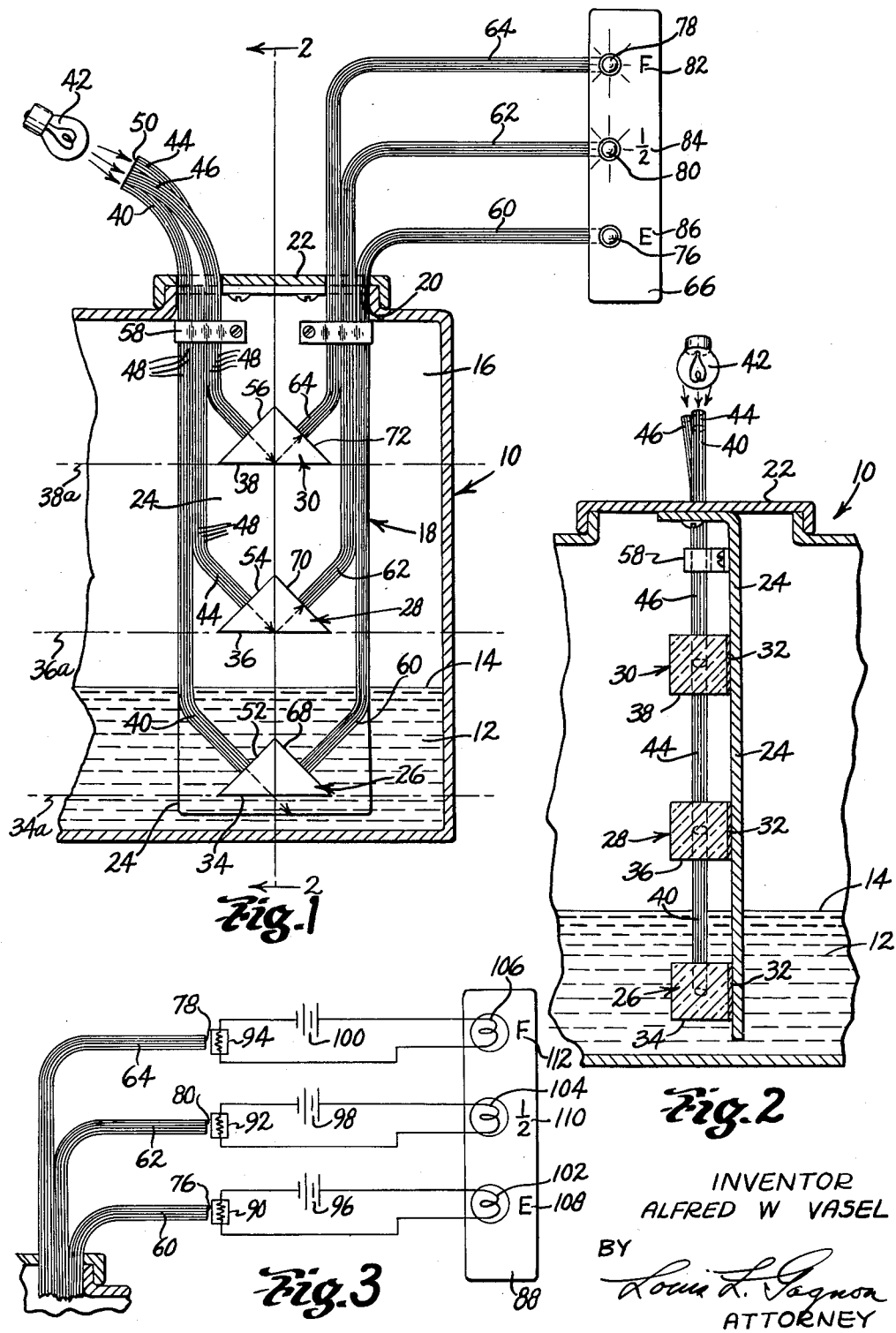

3,120,125
LIQUID LEVEL DETERMINING DEVICES
AND METHOD
Alfred W. Vasel, Brockton, Mass., assignor to American
Pyrotector, Inc., Southbridge, Mass., a corporation of
Massachusetts
Filed Aug. 3, 1960, Ser. No. 47,177
2 Claims. (Cl. 73—293)

This invention relates to means and method for sensing and indicating the level of liquids in containers.

Liquid level determining devices such as full tank gages or the like have, heretofore, embodied various mechanical and/or electro-mechanical arrangements employing floats connected by levers or linkages to various electrical meters or mechanical pointers which operate in conjunction with fixed references exteriorally of the tanks to provide an indication of the level of liquids stored in the tanks. Mechanical or electro-mechanical devices of this type are, for the most part, relatively complicated, intricate and expensive and are subject to malfunction with possible disastrous or otherwise costly consequences.

Accordingly, it is a principal object of the present invention to provide simple, inexpensive and substantially trouble-free means and method for detecting and measuring the level of liquids stored in containers.

Another object is to provide an improved liquid level measuring device which is unique in its simplicity of construction, precision of operation and freedom from malfunction.

Another object is to provide a device of the above character which operates without moving parts and which, when once properly installed, will provide permanent trouble-free means for determining the level of liquid in containers.

Another object is to provide optical transilluminating means for directing light into and from the interior of a liquid container and by means of which, detection and indication of the level of a liquid in said container is accomplished.

A further object is to provide, as a part of said transilluminating means, a plurality of optical elements disposed within said container, which elements are so characterized as to receive and redirect light by reflection when surrounded by a medium of different index of refraction than that of a liquid whose level is to be detected and rendered substantially non-reflective to light received thereby when contacted by said liquid.

A still further object is to provide a plurality of optical light-conducting fibers in prearranged grouped relation with each other and so associated with said optical elements in said liquid container as to provide means for conducting light into and from said elements.

Other objects and advantages of the invention will become apparent from the following description when taken in conjunction with the accompanying drawings in which:

FIG. 1 is a diagrammatic partially sectioned side view of a preferred form of the invention;

FIG. 2 is a cross-sectional view taken substantially along line 2—2 of FIG. 1 looking in the direction indicated by the arrows; and FIG. 3 is a diagrammatic illustration of a modification of the invention.

Referring more particularly to the drawings, it will be seen that there is provided in FIGS. 1 and 2, a tank 10 having a liquid 12 therein whose depth in the tank 10 is to be measured and indicated by detection of the level of its surface 14. It is to be understood that the liquid 12 may be a petroleum product, water, alcohol or any flowable substance whose index of refraction differs from air or other gases which occupy the unfilled portion 16 of the tank. It will also become apparent that the degree of transparency, turbidity and/or condition of viscosity of the liquid 12 are immaterial to the operation of the level sensing and indicating device of the invention which is indicated generally by numeral 18.

The device 18 is inserted vertically into the tank 10 through an appropriate access opening 20 therein which may or may not be capped with a cover such as 22 or the like.

In the present instance, however, the cover 22 provides, in part, a support for the various liquid level sensing elements of the device 18. In this respect, there is attached to the underside of the cover 22 a depending plate-like bracket 24 having a plurality of superimposed light-reflecting prisms 26, 28 and 30 cemented at 32 or otherwise rigidly attached to one of its sides (see FIG. 2).

The prisms are arranged along the bracket 24 so as to place their respective base portions 34, 36 and 38 at various preselected levels which the surface 14 of the fluid 12 may assume in the tank 10. The base portions 34, 36 and 38 of the prisms are disposed substantially parallel to the general plane which the liquid surface 14 assumes as it rises or lowers in the tank 10 so as to be substantially completely contacted throughout their respective areas when the liquid surface 14 reaches or exceeds the particular levels designated as 34a, 36a and 38a.

Leading from a location outside the tank 10 through the cover 22 and to the prisms 34, 36 and 38 are tansilluminators 40, 44 and 46 which function to direct light from a source 42 into the respective prisms 26, 28 and 30.

The transilluminators 40, 44 and 46 may each be in the form of a single elongated rod constructed of light-conducting material such as glass or lucite or the like but are preferably each constructed of a plurality of elongated relatively small light-conducting fibers 48 which are intimately bundled together and fused cemented or otherwise attached in side-by-side relation with each other at least at points adjacent their opposite ends.

The fibers 48 may be formed of any of the various known light-conducting materials. However, a preferred fiber construction, would comprise a core part of flint glass or the like which has a relatively high index of refraction surrounded by a relatively thin cladding of crown or soda lime glass or the like which has a relatively low index of refraction. The low index material functions to individually light-insulate the fibers, one from another, and thus prevent light which is being transferred by the fibers from escaping through their respective side walls into other adjacent fibers. This obviates the adverse effects of "cross-talk" or interaction of light between the transilluminators 40, 44 and 46 and also between the individual fibers 48 themselves.

The transilluminators 40, 44 and 46 are preferably intimately bundled together adjacent their ends which are outside the tank 10 so as to provide a relatively compact light-receiving face 50. The face 50 is formed by optically finishing the respective adjacent end faces of the fibers 48. The opposite ends of each of the transilluminators 40, 44 and 46 are similarly optically finished and are placed individually in optical end contact with the respective sides 52, 54 and 56 of the prisms 26, 28 and 30. The axes of the fibers 48 of each of the transilluminators are disposed substantially normal to the respective adjoining sides of the prisms adjacent their point of contact therewith so as to direct light from the transilluminators into the prisms 26, 28 and 30 along paths substantially normal to the sides 52, 54 and 56 and onto the respective prism bases 34, 36 and 38.

A clamp 58 is provided to hold the transilluminators 40, 44 and 46 securely in place on the bracket 24 and attachment of said transilluminators to the sides 52, 54 and 56 of the prisms 26, 28 and 30 is made with a suitable cement or the like or other suitable means. It is pointed out, however, that while cementing is preferable in this case, suitable clamps similar to 58 may be used to retain the transilluminators in optical end contact with the prisms. Also, while the prisms 26, 28 and 30 have been described as being cemented to the bracket, it should be understood that mechanical holding means in the form of clamps or the like may be employed for accomplishing substantially the same result.

Light from the source 42, when directed into the end face 50 of the grouped transilluminators, will be transferred thereby into the respective prisms 26, 28 and 30 as described above and reflected by the prism base portions 34, 36 and 38 only when said base portions are in air or in a medium having an index of refraction differing quite substantially from the index of refraction of the material of the prisms themselves. If, however, the prisms were immersed in a liquid having an index of refraction equal to or nearly of the same value as that of the material of said prisms, the light would not reflect from the prism bases but would pass into the liquid and be dispersed and/or partially absorbed by the liquid, as in the case of the prism 26 of FIGS. 1 and 2 which is illustrated as being below the surface 14 of the liquid 12.

The prisms 26, 28 and 30 are, for obvious reasons, constructed of glass or a suitable plastic or the like having an index of refraction equal to or approximating that of the particular liquid 12 which is to be used in the tank 10 so that, when immersed in the liquid 12, substantially no reflection of light from their base portions will take place but, when surrounded by air or some other similar medium, the base portions will reflect substantially all light directed thereonto.

In utilizing this light-reflecting feature of the prisms 26, 28 and 30 to provide an indication of the level of the fluid 12 in the tank 10, a second array of transilluminators 60, 62 and 64 are provided to receive light which is reflected from the prism base portions 34, 36 and 38 and to direct said light outwardly of the tank 10 to a display panel 66 by means of which an indication of the fluid level is provided as will be described in detail hereinafter.

The transilluminators 60, 62 and 64 are similar in structure to the above-described transilluminators 40, 44 and 46 and are provided with finished end surfaces attached to the sides 68, 70 and 72 of the respective prisms 26, 28 and 30 in a manner similar to the transilluminators 40, 41 and 42 so as to receive substantially all light which is reflected from the prism base portions. A clamp 74 is provided to hold the transilluminators 60, 62 and 64 securely in place on the bracket 24. Outwardly of the tank 10, the transilluminators 60, 62 and 64 are separated from each other and secured to the display panel 66 with their respective end faces exposed and facing forwardly of the panel 66. The transilluminators 60 which receives light from the lowermost prism 26 is arranged to have its end face adjacent the bottom of the panel 66 and the transilluminator 64 which receives light from the uppermost prism 30 is arranged to have its end face 78 adjacent the top of the panel 66 while the transilluminator 62 which receives light from the intermediate prism 28 is arranged to have its end face 80 between the end faces 76 and 78.

When the device 18 is in operation, light from the source 42 is continually directed into the receiving transilluminators 40, 44 and 46 and when the liquid surface 14 is at or above the level of the line 38a, all of the prism bases 34, 36 and 38 will be covered by the liquid 12 and thereby rendered substantially non-reflective with the result that no appreciable amount of light will be received by the transilluminators 60, 62 and 64 and their respective end faces 76, 80 and 78 will be dark. This gives an indication that the tank is full of liquid or at least that the liquid is above the pre-established level of line 38a. When the liquid level is lowered so that the base 38 of prism 30 is no longer wetted by the liquid 12 but is surrounded by air or other gases, reflection of light entering the prism 30 will take place wherein said reflected light will pass into the transilluminator 64 and illuminate its face 78 giving an indication that the liquid level is somewhere in between the preestablished levels of lines 38a and 36a. At this time the end faces 76 and 80 will still be dark.

When the fluid level reaches the condition illustrated in the drawings, reflection of light from the base portions of both of the prisms 28 and 30 will illuminate the end faces 80 and 78 on the panel 66 and thus indicate that the liquid level is between the pre-established levels of lines 34a and 36a.

In like manner, when the liquid surface 14 drops below the line 34a, all of the end faces 76, 80 and 78 will be illuminated at the panel 66 by reflection of light from the base portions of all of the prisms 26, 28 and 30.

Indicia markings 82, 84 and 86 on the panel 66 will indicate the condition of liquid level in the tank 10 in accordance with the pre-established levels at which the prisms 26, 28 and 30 are fixed upon the bracket 24.

While only three prism-transilluminator measuring elements have been shown and described hereinabove, it should be understood that any number of such measuring elements similarly arranged and placed between those shown in FIGS. 1 and 2 may be used to indicate liquid levels between the lines 34a, 36a and 38a.

It is also pointed out that the transilluminators 40, 44, 46, 60, 62 and 64 may be of any desired lengths, within practical limits, so as to permit the placement of both the light source 42 and indicating panel 66 at convenient locations within a vehicle or the like, which locations might be at considerable distances from the tank 10. If, however, the distance from the tank 10 to a location where the indicating panel must be located is excessive and for all practical purposes it would not be desirable to use the required extended lengths of transilluminators, an electrically operated repeater system such as diagrammatically illustrated in FIG. 3 might be employed to place an indicating panel 88 in a desired location remote from the tank 10.

In the system of FIG. 3, a liquid level detection arrangement identical to that of FIGS. 1 and 2 would be used with the exception that the panel 66 would normally be eliminated. In place of the panel 66, conventionally known photoresistive elements 90, 92 and 94 are placed adjacent the end faces 76, 80 and 78 of the respective transilluminators 60, 62 and 64. The photoresistive elements are so placed as to receive light only from their respective adjacent transilluminators and are of such character as to become electrically conductive when illuminated and substantially non-conductive when dark. Each of the photoresistive elements are electrically connected separately in series with individual sources of current 96, 98 and 100 respectively and indicating lamps 102, 104 and 106 on the panel 88. By a proper selection of values for the elements 90, 92 and 94 and their respective individual sources of current 96, 98 and 100, which selection would be well within the skills of the art, the photoresistive elements will function to block a flow of current through their respective lamps when dark (not illuminated by the transilluminators 60, 62 and 64) and permit a flow of current through the said lamps when illuminated.

In this way, it can be seen that by placing the lamps 102, 104 and 106 on the panel 88 in the same geometrical pattern as that of the end faces 76, 80 and 78 of the transilluminators, light emitted by any one or more of the transilluminators will cause a corresponding lighting of their respective associated lamps to provide a visual indication on the panel 88 of the condition of liquid level in the tank 10. Indicating markings 108, 110 and 112 are provided on the panel 88 in similar fashion to the markings 86, 84 and 82 on panel 66, FIG. 1 and for the same purpose.

It is pointed out with more particular reference to FIGS. 1 and 2 that by employing flexible bundles of light-conducting fibers in the fabrication of the transilluminators 40, 44, 46, 60, 62 and 64, installation problems which would normally be encountered with rigid light pipes would be obviated. That is, flexible fiber optical transilluminators functioning as light pipes could be contoured by bending to conform to practically any irregular path leading from the tank 10 to the indicating panel 66 and/or light source 42 in the installation of the apparatus of the invention. In a similar manner, it can be seen that the indicating panel 88, FIG. 3, can be easily installed at a remote location from the position of the photoresistive elements 90, 92 and 94, there being nothing more than electrical wiring interconnecting the panel 88 with the said photoresistive elements.

It should also be understood that various different types of photosensitive devices, other than photoresistive elements, and proper associated electrical circuitry may be employed to operate the lamps 102, 104 and 106. Also, by parallel connection to the circuits shown in FIG. 3, several indicating panels such as 88 may be simultaneously operated by the photoresistive elements 90, 92 and 94 and by placing the several indicating panels at different locations, various remote observing stations may be established for determining the level of the liquid in a single tank.

From the foregoing, it can be seen that simple, efficient and economical means and method have been provided for accomplishing all of the objects and advantages of the invention as expressed in the accompanying claims and the invention is not to be limited to the exact matters shown and described as only the preferred matters have been given by way of illustration.

Having described my invention, I claim:

1. A device of the character described for detecting and remotely indicating different levels of liquid in a container comprising in combination a plurality of liquid level detecting prisms each having a base surface characterized in that it will transmit light when immersed in a liquid and reflect light internally thereof when not in contact with a liquid, illuminating means, first long and thin light-conducting fiber means arranged to direct light from said illuminating means into said prisms, level indicating means located remotely of said prisms and second long and thin light-conducting fiber means optically coupling said prisms to said indicating means, means for supporting said prisms in said container with their respective base surfaces disposed in vertically spaced substantially horizontal planes each at a different preselected level in said container, said first long and thin light-conducting fiber means embodying a plurality of first groups of light-conducting fiber elements, said first groups of fiber elements being equal in number to the number of said prisms and each having one of their respective ends in optical contact with a first side of a respective prism, the opposite ends of said first groups of fiber elements being disposed adjacent said illuminating means to collectively receive light therefrom and cause said fiber elements to conduct said light into said respective prisms, said ends of said first groups of fiber elements in optical contact with said first side of each of said prisms being so arranged as to direct said light onto the respective base surfaces of said prisms at angles such as to be reflected by said base surfaces to a second side respectively of said prisms when said base surfaces are not immersed in a liquid, said second long and thin light-conducting fiber means embodying a plurality of second groups of light-conducting fiber elements equal in number to the number of said prisms and having at least one of their respective ends in optical contact with each of said second sides of said respective prisms and being so arranged relative to said respective second sides as to receive substantially only light internally reflected by the respective base surfaces of said prisms whereby said light will be conducted to opposite ends of said second groups of light-conducting fiber elements, said opposite ends of said second groups of light-conducting fiber elements being so arranged individually adjacent said level indicating means as to illuminate the same and means associated with said level indicating means to identify the respective prism from which light is being reflected.

2. A device of the character described for detecting and remotely indicating different levels of liquid in a container comprising in combination a plurality of liquid level detecting prisms each having a base surface characterized in that it will transmit light when immersed in a liquid and reflect light internally thereof when not in contact with a liquid, illuminating means, first long and thin light-conducting fiber means arranged to direct light from said illuminating means into said prisms, level indicating means located remotely from said prisms and second long and thin light-conducting fiber means optically coupling said prisms to said indicating means, means for supporting said prisms in said container with their respective base surfaces disposed in vertically spaced substantially horizontal planes each at a different preselected level in said container, said first and second light-conducting fiber means being formed of a plurality of light-conducting fiber elements each embodying a core part of light-conducting material having a reltaively high index of refraction surrounded by a relatively thin cladding of material having a relatively low index of refraction, said first long and thin light-conducting fiber means embodying a plurality of first groups of said light-conducting fiber elements, said first groups of fiber elements being equal in number to the number of said prisms and further being of preselected lengths one different from another by amounts in accordance with the spacings between said horizontal planes at said different preselected levels in said container, one end of each of said first groups of fiber elements being placed in optical contact with a first side of one of said prisms, the opposite ends of said first groups of fiber elements being bundled relatively compactly together and disposed adjacent said illuminating means to collectively receive light therefrom and cause said fiber elements to conduct said light into said prisms, said ends of said first groups of fiber elements in optical contact with said first side of each of said prisms being so arranged as to direct said light onto respective base surfaces of said prisms at angles such as to be reflected by said base surfaces to a second side respectively of said prisms when said base surfaces are not immersed in a liquid, said second long and thin light-conducting fiber means embodying a plurality of second groups of said light-conducting fiber elements, said second groups of fiber elements being equal in number to the number of said prisms and further being of preselected lengths one differing from another by amounts in accordance with the spacings between said horizontal planes at said different preselected levels in said container, one end of each of said second groups of fiber elements being placed in optical contact with one of said second sides of said prisms and so arranged thereon as to receive substantially only light internally reflected by the respective base surfaces of said prisms and to conduct said reflected light to opposite ends of said second groups of light-conducting fiber elements, said opposite ends of said second groups of light-conducting fiber elements being so arranged individually adjacent said level indicating means as to illuminate the same and means associated with said level indicating means to identify the respective prism from which light is being reflected.

References Cited in the file of this patent

UNITED STATES PATENTS

| | | |
|---|---|---|
| 1,351,562 | Foster | Aug. 31, 1920 |
| 1,706,857 | Mathe | Mar. 26, 1929 |
| 1,933,763 | Russell | Nov. 7, 1933 |
| 2,333,492 | Ridge | Nov. 2, 1943 |
| 2,368,705 | Du Pont et al. | Feb. 6, 1945 |
| 2,468,833 | Murphy | May 3, 1949 |
| 2,665,327 | Martin | Jan. 5, 1954 |
| 2,825,260 | O'Brien | Mar. 4, 1958 |
| 2,877,368 | Sheldon | Mar. 10, 1959 |
| 2,943,530 | Nagel | July 5, 1960 |

FOREIGN PATENTS

| | | |
|---|---|---|
| 273,729 | Great Britain | Feb. 2, 1928 |

OTHER REFERENCES

Revere Corporation of America—Engineering Bulletin No. 1065—pp. 2 and 3, printed 3/58. Received in U.S. Patent Office April 29, 1959 (copy in 73/293, Div. 66).

Liquid Sensing Device with No Moving Parts, by Dell Phillips, Product Engineering, vol. 23, No. 6, June 1952, pp. 134, 135.